(12) United States Patent
Yuasa

(10) Patent No.: US 11,443,618 B2
(45) Date of Patent: Sep. 13, 2022

(54) APPARATUS AND METHOD FOR CORRELATING ENVIRONMENT DATA WITH TRAFFIC DATA

(71) Applicant: Avanti R&D, Inc., Torrance, CA (US)

(72) Inventor: Go Yuasa, Rancho Palos Verdes, CA (US)

(73) Assignee: Avanti R&D, Inc.

(*) Notice: Subject to any disclaimer, the term of this patent is extended or adjusted under 35 U.S.C. 154(b) by 0 days.

(21) Appl. No.: 17/131,746

(22) Filed: Dec. 23, 2020

(65) Prior Publication Data

US 2021/0201665 A1 Jul. 1, 2021

Related U.S. Application Data

(63) Continuation-in-part of application No. 16/805,791, filed on Mar. 1, 2020, now Pat. No. 10,930,145.

(60) Provisional application No. 62/955,809, filed on Dec. 31, 2019.

(51) Int. Cl.
| | |
|---|---|
| *G08G 1/01* | (2006.01) |
| *G08G 1/048* | (2006.01) |
| *G06K 9/62* | (2022.01) |
| *G06V 20/54* | (2022.01) |

(52) U.S. Cl.
CPC .......... *G08G 1/0133* (2013.01); *G06K 9/6292* (2013.01); *G06V 20/54* (2022.01); *G08G 1/0116* (2013.01); *G08G 1/048* (2013.01); *G06V 2201/08* (2022.01)

(58) Field of Classification Search
CPC .... G08G 1/0133; G08G 1/0116; G08G 1/048; G08G 1/0129; G08G 1/0141; G08G 1/04; G08G 1/096716; G06K 9/00785; G06K 9/6292; G06K 2209/23
See application file for complete search history.

(56) References Cited

U.S. PATENT DOCUMENTS

| | | | | |
|---|---|---|---|---|
| 5,251,285 | A * | 10/1993 | Inoue | G05B 13/0295 706/10 |
| 5,401,967 | A * | 3/1995 | Stedman | G01N 21/33 250/338.5 |
| 9,890,969 | B2 | 2/2018 | Martin | |
| 10,440,452 | B2 | 10/2019 | Mach et al. | |

(Continued)

*Primary Examiner* — Hongmin Fan
(74) *Attorney, Agent, or Firm* — Baba Patent Agency

(57) ABSTRACT

An environmental assessment system for correlating environmental data with traffic data having, a traffic/environment system including a) a traffic count system for obtaining the traffic data of moving objects on a road, and classifying the moving objects into several vehicle types, b) an environmental sensor system including a particulate matter (PM) sensor for measuring PM concentration and/or a carbon dioxide ($CO_2$) concentration sensor, c) a microphone for obtaining sound signals originated from the moving objects on the road, d) a communication device and e) a microcomputer/memory for running computer programs, the computer programs including a function for adding a time stamp showing a time onto the traffic data, and a sever having functions for correlating the traffic data with the environmental data, wherein the traffic count system is arranged to classify the traffic data by referring to the sound signals obtained by the microphone.

10 Claims, 3 Drawing Sheets

(56) References Cited

U.S. PATENT DOCUMENTS

| | | | |
|---|---|---|---|
| 2011/0313958 A1* | 12/2011 | Roverso | G01W 1/00 706/12 |
| 2014/0229255 A1* | 8/2014 | Scofield | G06Q 30/0207 705/14.21 |
| 2015/0077737 A1 | 3/2015 | Belinsky et al. | |
| 2018/0074034 A1* | 3/2018 | Jones | G06Q 30/02 |
| 2019/0052804 A1* | 2/2019 | Maruhashi | H04N 5/23222 |
| 2021/0001891 A1* | 1/2021 | Majithia | G01C 21/20 |
| 2021/0274292 A1* | 9/2021 | Solum | H04R 25/40 |

* cited by examiner

| | | PM2.5 | Bicycles | Motorcycles | EV | Sedan | Bus-gas. | Bus-die. | Truck-gas. | Truck-die. |
|---|---|---|---|---|---|---|---|---|---|---|
| Measurment Points | P1 | 31 | 15 | 32 | 210 | 332 | 20 | 31 | 18 | 20 |
| | P2 | 59 | 18 | 45 | 190 | 290 | 25 | 28 | 21 | 35 |
| | P3 | 81 | 2 | 51 | 285 | 346 | 32 | 49 | 28 | 45 |
| | P4 | 89 | 9 | 42 | 200 | 290 | 30 | 44 | 35 | 59 |
| | P5 | 41 | 15 | 30 | 162 | 235 | 28 | 26 | 25 | 29 |
| | P6 | 29 | 3 | 9 | 251 | 181 | 8 | 31 | 24 | 19 |
| Average | | 55 | 10.3 | 34.8 | 216.3 | 279.0 | 23.8 | 34.8 | 25.2 | 34.5 |
| Covariance to PM2.5 | | | | -36.3 | 252.0 | 189.3 | 675.3 | 145.3 | 161.3 | 99.3 | 322.7 |
| Colleration Factor to PM 2.5 | | | | -0.25 | 0.79 | 0.20 | 0.51 | 0.77 | 0.80 | 0.79 | 0.98 |

# APPARATUS AND METHOD FOR CORRELATING ENVIRONMENT DATA WITH TRAFFIC DATA

CROSS-REFERENCE

This application is a continuation in part of U.S. patent application Ser. No. 16/805,791, filed on Mar. 1, 2020, currently pending, which claims the priority benefit under 35 U.S.C. sec. 119 (e) to U.S. provisional application Ser. No. 62/814,790 filed on Mar. 6, 2019. Further, this application claims the priority benefit under 35 U.S.C. sec. 119 (e) to U.S. provisional application Ser. No. 62/955,809 filed on Dec. 31, 2019. All these applications are hereby incorporated reference into the present application.

BACKGROUND OF THE INVENTION

Technical Field

The present invention relates to a technical field of an apparatus and a method for correlating environmental data with traffic data, more particularly this invention relates to a technical field of an environmental assessment system for correlating environmental data including particulate matter, such as PM1.0, 2.5, 4.0 and 10, and $CO_2$ with traffic data including particular types of vehicle, such as trucks, buses and utility vehicles having a gasoline engine, a diesel engine, hybrid engine or EV engine, motorcycles and bicycles to find out the main causes of environmental degradation. Still, more particularly, a present invention relates to an environmental assessment system for measuring air quality parameters and analyzing the data collected to provide recommendations for improving the air quality parameters.

Traffic congestion and environmental pollution have become a serious problem not only in developing countries but also in developed countries. At present, there is a lively debate on global warming, which is an issue for countries around the world, especially local governments in each country. It is necessary to identify the causes of environmental pollution.

SUMMARY OF THE INVENTION

The present invention attempts to solve the aforesaid problem. An objective of an embodiment of the present invention is to provide an environmental assessment system for correlating environmental data with traffic data having, a traffic/environment system including a) a traffic count system for obtaining the traffic data, the traffic data including an image sensor for counting a number of moving objects on a road, and classifying the moving objects into vehicle types, b) an environmental sensor system including a particulate matter (PM) sensor for measuring PM concentration emitted from the moving objects and/or a carbon dioxide ($CO_2$) concentration sensor for measuring carbon oxide concentration included in air originated from the moving objects, c) a microphone for obtaining sound signals originated from the moving objects on the road, d) a communication device for transmitting and receiving the traffic data and the environmental data between other traffic/environment systems and other devices via a network linked thereof, and e) a microcomputer/memory for running computer programs, the computer programs including a function for adding a time stamp showing a time onto the traffic data when the traffic data is obtained, and a sever having functions for correlating the traffic data with the environmental data transmitted from the traffic/environment system via the network, wherein the traffic count system is arranged to classify the traffic data by referring to the sound signals obtained by the microphone.

It becomes possible to find out the main causes for emitting particulate matters and $CO_2$ by counting the numbers of moving objects on the road, classifying the moving objects into several categories, such as cars, motorcycle, buses, and trucks having a gasoline engine or a diesel engine, etc. and correlating those data with the environment data including particulate matter (PM) and $CO_2$. Then, the local government can identify the causes of air pollution and make countermeasures for stopping or reducing air pollution associated with traffic on the road.

By installing a microphone for capturing sound signals including audible signals originated from the moving objects on the road into the environmental assessment system, it becomes possible to identify the differences between a moving object having a gasoline engine and a moving object having a diesel engine, and between a bicycle and a motorcycle even though the differences cannot be observed by capturing images of the moving object. Further, it becomes possible to accurately classify vehicles into several vehicle categories, such as a compact car, a mid-sized car, a luxury car, and an RV (Recreation Vehicle) having gasoline engine, diesel engine, a hybrid engine, or EV engine. Thus, a more detailed and effective countermeasure can be set setup.

DETAILED DESCRIPTION OF THE INVENTION

Hereinafter, embodiments of the present invention will be described with reference to the accompanying drawings.

Figure 1:
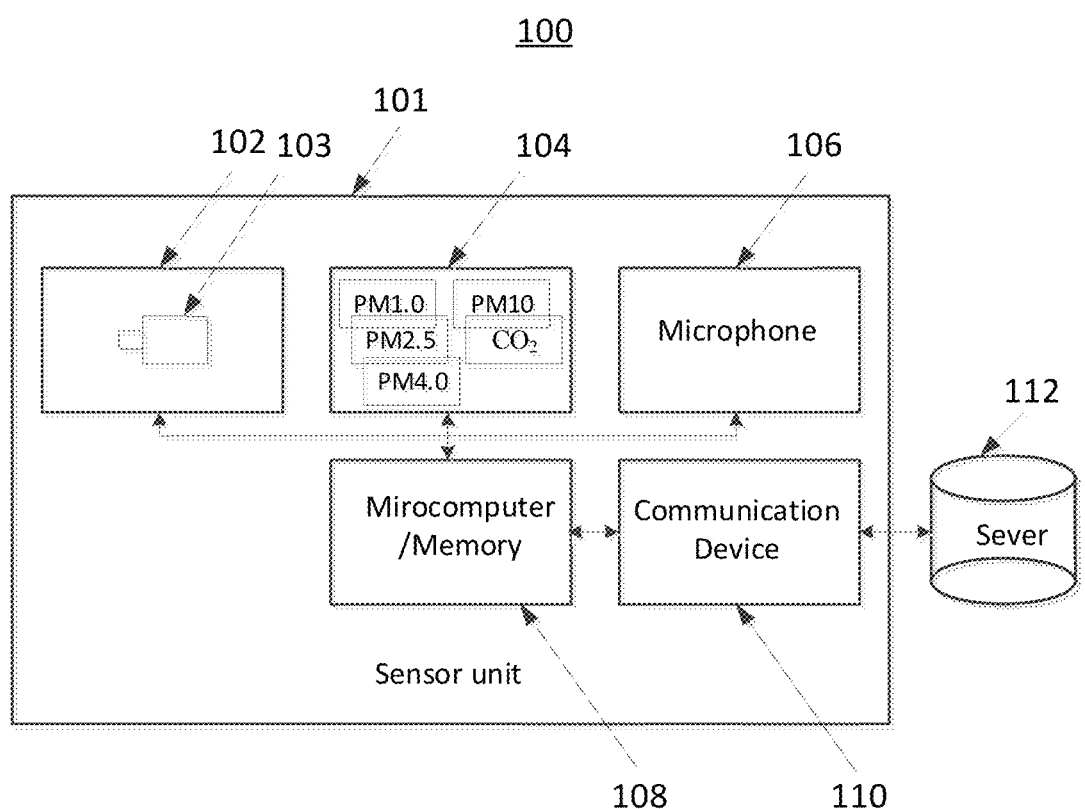
FIG. 1 illustrates the configuration of an environmental assessment system for correlating environmental data with traffic data.

FIG. 1 illustrates an environment assessment system 100 for correlating environmental data with traffic data to investigate the main causes of particulate matter, such as PM 1.0, 2.5, 4.0, 10, and carbon dioxide $CO_2$. The environment assessment system 100 comprises traffic/environment system 101 including a) a traffic count system 102 having an image sensor 103 for identity and counting the number of moving objects passing through a certain point within a certain amount of a time slot on the road, b) an environmental sensor 104 for measuring PMs (particulate matter) and $CO_2$ concentration, c) a microphone 106 for capturing sound signals originated mainly from engines of moving objects on the road, d) a microcomputer/memory 108 for analyzing and controlling data in traffic/environment system 101 and d) a communication device 110 for transmitting and receiving data between traffic/environment system 101 and a sever 110 for controlling and storing those data from environment assessment system 100.

Figure 2:
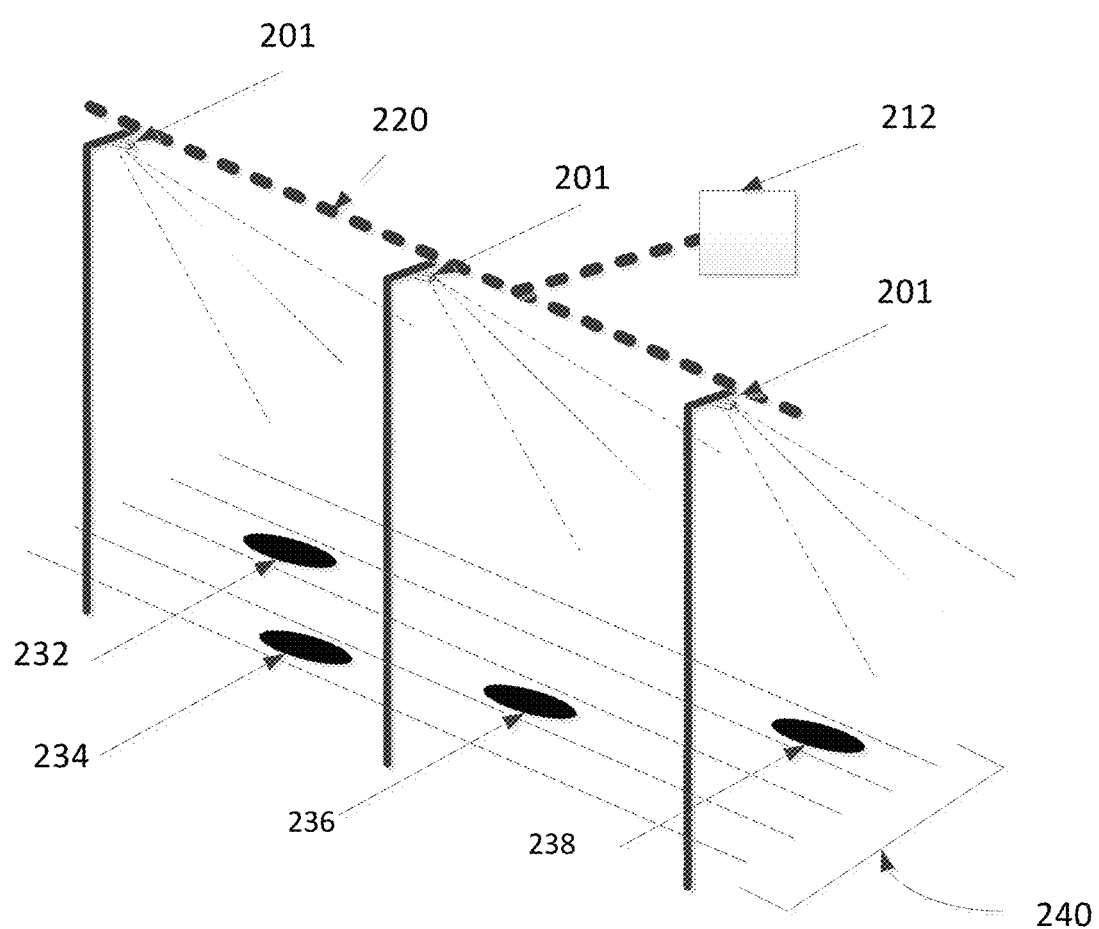
FIG. 2 illustrates an environment assessment system installed on a pole at the roadside on a road having four lanes.

The traffic count system 102 includes an image sensor 103 for measuring the speed of each moving object, the number of each moving object, and directions of each moving object. The speed of each moving object between two points where traffic/environment system 101 is installed is calculated by identifying the same moving objects based on the captured image data on each road lane of the road. Then traffic count system 102 is arranged to classify the moving objects into vehicle types, such as a bicycle, a motorcycle, a sedan, an RV (Recreation Vehicle), a bus, a truck. Traffic/environment systems 101 are installed on a plurality points along roads as illustrated in FIG. 2, (which will be described later).

Computer programs running on microcomputer/memory 108 have functions for giving the same identification code (Re-ID) on two moving objects when the computer programs identify that the two moving objects are the same based on the color, shape, classification of the moving objects at two observation points where a traffic/environment system 101 is installed. As recited above, traffic/environment system 101 is arranged to automatically extract the color, shape, and classification of the moving objects, and transmit them to the neighboring traffic/environment systems 101 along with timestamp data and a sensor ID.

Based on the information, the neighboring traffic/environment system 101 checks transmitted data whether the same moving object passes through its own traffic/environment system 101. When the same moving object is recognized, the same identification codes (Re-ID) are given on two moving objects. Then traffic/environment system 101 sends the information to server 112 including the speed of the moving object being obtained by measuring travel time between two traffic/environment systems 101. Further, the computer programs running on microcomputer/memory 108 have functions for uploading those traffic data every thirty seconds to server 110 in this embodiment, but not limited to thirty seconds. It may be set to 10 seconds, 60 seconds, or 120 seconds.

Further, it becomes possible to determine a storing term for keeping the Re-ID code in server 112 based on the moving time of the moving object between two sensor points so that it becomes possible to keep unnecessary personal information in the traffic/environment system 101 or in the server 112. Also, this function is important for not keeping unnecessary personal information on the server.

Traffic/Environment Systems

FIG. 2 illustrates an embodiment of the deployment of traffic/environment systems 201 on the road of the present invention. A plurality of traffic/environment systems 201 is installed on poles at the roadside on a road 240 having four lanes in this embodiment. Traffic/environment system 201 has a capability for covering six lanes on a road in this embodiment, but not limited to this. The capacity for covering can be determined based on each application. Each traffic/environment system 201 installed on a pole is linked via a mesh network 220. An image sensor 103 (refer to FIG. 1) included in each traffic/environment system 201 is arranged to capture traffic images on each lane of road 240. Each traffic/environment system 201 is arranged to capture moving objects 232, 234, 236, and 238 on road lanes 240, such as buses, trucks, cars, motorcycles, bicycles, pedestrians, etc.

Captured images of moving objects are analyzed, categorized into several moving categories in each image sensor 103 installed in traffic count system 102 (FIG. 1) and the analyzed results are temporally stored in each traffic/environment system 201. Then stored data in each traffic/environment system 201 are transmitted to server 212 via a mesh network 220. The captured images are analyzed at each image sensor to classify the captured images into several classified moving objects, such as buses, trucks, cars, motorcycles, bicycles, pedestrians, etc. by the computer programs running in each image sensor 103 in this embodiment.

Sensors for Measuring PMs and $CO_2$

Back to FIG. 1, environmental sensors 104 includes particulate matter, such as PM1.0, 2.5, 4.0, and 10, and $CO_2$ sensors for measuring $CO_2$ level in an observation region near the traffic lanes in this embodiment. Unique sensor ID (SID) is assigned to each traffic/environment system 201 and data from each traffic/environment system 201 includes the SID and a timestamp to show when the data is obtained by each traffic/environment system 201. Environmental sensors 104 obtain environmental data every one (1) second in this embodiment but not limited to 1 second. A measuring cycle may be determined from one second to one hour according to the situation.

It takes a certain amount of travel time of exhausted gasses emitted from moving objects to arrive at the point where the environmental sensor 104 is installed. On other hand, image data captured by image sensor 103 in traffic count system 102 is recognized by image sensor 103 in a real-time. Accordingly, the timing for obtaining environmental data by environmental sensor 104 and the timing of for obtaining the image data of the moving object by the image sensor 103 are different. Accordingly, it is necessary to take account of the time difference to synchronize the environmental data and traffic data can be synchronized.

Sensor for Obtaining Sound Signals—Microphone

There is provided a microphone 106 for picking up sound and noise signals mainly originated from moving objects on the road in traffic/environment system 101 in this embodiment. These sound and nose signals mainly originated from the engine of moving objects on the road are used to identifying an engine type of a moving object which cannot be identified by captured image data of moving objects. Further, it becomes possible to find out a moving object behind a large moving object such as big trucks and buses on the road. For example, a compact car behind big a truck cannot be captured by image sensor 103.

Sound signals originated from a small-sized car behind a big truck can be used to recognize the small-sized car behind a big truck by utilizing sound signals originated from the small-sized car behind the big truck. To use this function, it is necessary to learn the relationship between engine sound-signal-shape and a frequency-range associated with the vehicle have been learned in advance. For example, sound differences between a diesel engine, a gasoline engine, a hybrid engine, and an EV based engine which cannot be identified by capturing images by image sensors 103, will be identified by utilizing sound signals captured by the microphone 106. By utilizing sound signals, more accurate and traffic data can be obtained which improves the accuracy of the traffic data.

To analyze and determine an engine type of moving object using sound signals originated from moving objects, pre-learning of specific sound-signal-shapes and frequency ranges of the specific sound are required to classify a moving object without seeing the moving object. Motorcycle engines, diesel engines, gasoline engines, hybrid engines, and electric car engines have their specific engine sound waves form having specific frequency ranges. Further, running noise created between the road surface and wheels of a vehicle, which changes depending on weather conditions (rains and snows), may be learned in advance so that detailed sound analysis becomes available.

By using these specific sound data obtained by the microphone 106, it becomes possible to identify a moving object behind a large-sized moving object and to link the relationship between traffic data and environmental data originated from a moving object behind a big moving object, which was impossible to identify and link data between environmental data and traffic data.

Further, microphone 106 is used to measure noise pollution levels associated with moving objects on the road. Sound signals emitted from moving objects on the road have become public problems not only in developed countries but also in less developed countries. Sound signals obtained by the microphone are analyzed to search the main causes of the noise pollution and to find the solution to decrease the noise polluting levels to provide recommendations for protecting human health from exposure to environmental noise originating from various moving objects on the road.

Microcomputer/Memory

Computer programs running on Microcomputer/Memory 108 are arranged to control data from traffic count system 102, environmental data of environmental sensors 104, and sound data from microphone 106. Then, processed data by the computer programs running on Microcomputer/Memory 108 is transmitted to server 112 via communication device 110 for further data analysis for correlating environmental data with traffic data to investigate the main causes of, such as PM 2.5 and 10 (particulate matter) and carbon dioxide $CO_2$ and traffic data.

Server

Data including traffic data and environmental data from traffic/environment system 101 are transmitted to server 112 via communication device 110 in traffic/environment system 101. Traffic data from traffic count system 102 is transmitted to server 112 every thirty seconds in this embodiment with a unique sensor ID (SID) and time stamp data. Image signals captured by image sensor 103 are analyzed and classified and categorized into several categories such as buses, trucks, cars, motorcycles, bicycles, and pedestrians in image sensor 103 within a second.

On the other hand, $CO_2$ and particulate matter (PM) included in exhaust gas from moving objects on the road take time to reach the point where environmental sensor 104 in the traffic/environment system 101 is installed. Accordingly, this time lag must be taken into account when correlating environmental data from environmental assessment system 104 with traffic data from traffic count system 102. Server 112 has a function for obtaining a correlation coefficient between the traffic data and environmental data in this embodiment. However, computer programs running on microcomputer/memory 108 is arranged to has a function for obtaining a correlation coefficient between the traffic data and environmental data when microcomputer/memory 108 has enough capability to calculate a correlation coefficient between the traffic data and environmental data instead of Server 112.

How to Correlate Environmental Data with Traffic Data

In this embodiment, environmental data includes a concentration of PM1.0 2.5, 4.0, 10.0 ($\mu g/m^3$) and $CO_2$ concentration (ppm: parts per million), and traffic data includes classified data of moving objects, such as, bicycles, motorcycles, cars (sedans), RVs (Recreation Vehicles), buses, pickup trucks, big trucks which include a gasoline engine, a diesel engine, a hybrid engine, a Fuel Cell engine of an EV (battery) engine. Further traffic data includes numbers of moving objects passing through a certain point in a predetermined time slot, speed, and directions thereof.

The correlation coefficient is a figure for expressing a degree to which two variables tend to change together. A correlation coefficient, generally, the closer it is to +1 the more "strong positive correlation", the closer it is to −1, the more "strong negative correlation", and the closer it is to 0, the more "there is almost no correlation. The correlation coefficient indicates both the strength and direction of the relationship. There are several tools to measure the correlation coefficient between two data picked up from each category.

Followings are one of the embodiments to calculate the correlation coefficient between two variables, such as one of the particulate matters and a number of moving objects passing by at a certain point within a certain period in this embodiment.

Example of Correlation Between Traffic Data and Environmental Data

The correlation coefficient between two variables can be calculated from the equation using the covariance and standard deviation of the two variables.

$$r = \frac{\frac{1}{n}\sum_{i=1}^{n}(xi-X)(yi-Y)}{\sqrt{\frac{1}{n}\sum_{i=1}^{n}(xi-X)(xi-X)} \times \sqrt{\frac{1}{n}\sum_{i=1}^{n}(yi-Y)(yi-Y)}} \quad (1)$$

Where
r: Correlation coefficient between x and y
n Total number of data
$(xi, y_i)$: Value of $i^{th}$ data of x and y
X: Average value of xi
Y: Average value of yi Following is an embodiment of the present invention for obtaining correlation coefficients between PM2.5 and each classified moving object on a street in a city in Southern California. Inventors installed a total of six (6) traffic/environment systems at six points (P1, P2, P3, P4, P5, and P6) on the main street in a city in Southern California.

Inventors measure the concentration of PM 2.5 and traffic data (total number of the moving object in each category in one hour) of moving objects which are categorized into eight (8) traffic categories being bicycles, motorcycles, EV, sedans (gasoline engine), Bus-gasoline engines, Bus-diesel engines, Truck-gasoline engines, and Truck-diesel engines. These data are measured from 10 AM to 11 AM.

Figures 3, 4:
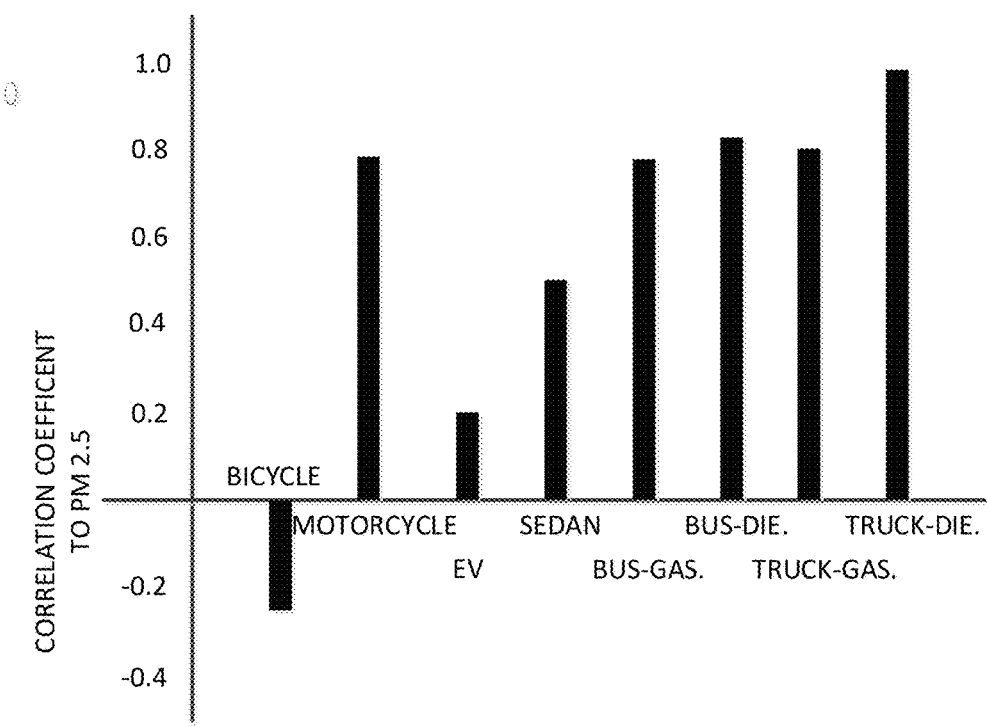
FIG. 3 illustrates an example of correlation data between PM data and traffic data.
FIG. 4 illustrates a bar graph for showing a comparison of correlation coefficients between PM2.5 and vehicle categories.

FIG. 3 illustrates the measurement results showing the concentration of PM 2.5 and the number of moving objects passing each measuring point in one hour of eight traffic categories at six mearing points P1~P6.

The traffic/environment systems 101 installed on the main street are arranged to measure the concentration of PM2.5 in every one second and count the number of moving objects every three minutes at each test point. FIG. 4 illustrates the measuring results of PM 2.5 and the total number of moving objects passing through the measuring points.

The concentration of PM2.5 at a measuring point 3 (P3) in the table shown in FIG. 4, "81" is, for example, an average concentration of PM 2.5 in each three minute-time slot of a total twenty time-slots in one hour between 10 AM-11 AM. Traffic data under each vehicle category of moving object is data obtained by counting and being categorized in each category of moving object passing through each measuring point between 10 AM-11 AM.

Then, inventors calculate to obtain an average value of PM2.5, an average value of each moving category, and covariance between PM2.5 by applying formula (1) recited above.

FIG. 4 illustrates a bar-graph showing the correlation coefficient between PM2.5 and each moving object category shown in FIG. 4.

According to the test results illustrated in FIG. 5, the obtained correlation coefficient between PM2.5 and each moving object category, diesel trucks (correlation coefficient: 0.98) and diesel buses (correlation coefficient: 0.80) have a strong correlation in this embodiment. In this case, inventors have found that the correlation coefficient of motorcycles (0.79) is also the main cause of environmental degradation.

Then, local governments can make rules to restrict the entry of diesel-powered vehicles into a concerned place at certain times of the day. Further, diesel engine makers can use these data to reduce the exhaust air including PM. Particularly, those data can be useful data to calibrate diesel engines at a developing stage of diesel engines.

By using this formula for obtaining a correlation coefficient between environmental data and traffic data, effective countermeasures for improving environmental conditions can be established. Then the local government can set the countermeasures for improving environmental conditions.

Having the teachings of the invention disclosed herein, one skilled in the art to which this invention pertains will find it to be within the purview of ordinary skill in the art. Obviously, many modifications and variations of the present invention be possible in the light of the above the scope of the appended claims, the invention may be practiced otherwise than as specially described.

What is claimed is:

1. An environment assessment system for correlating environmental data with traffic data comprising:
   a traffic/environment system comprising:
   a) a traffic count system for obtaining the traffic data, the traffic count system including an image sensor for counting a number of moving objects on a road, and classifying the moving objects into vehicle types;
   b) an environmental sensor system including a particulate matter (PM) sensor for measuring PM concentration emitted from the moving objects and/or a carbon dioxide ($CO_2$) concentration sensor for measuring carbon oxide concentration included in air originated from the moving objects;
   c) a microphone for obtaining sound signals originated from the moving objects on the road;
   d) a communication device for transmitting and receiving the traffic data and the environmental data between other traffic/environment systems and other devices via a network linked thereof; and
   e) a microcomputer/memory for running computer programs, the computer programs including a function for adding a time stamp showing a time onto the traffic data when the traffic data is obtained, and
   a server having functions for correlating the traffic data with the environmental data transmitted from the traffic/environment system via the network,
   wherein the traffic count system is arranged to classify the traffic data by referring to the sound signals obtained by the microphone, and
   wherein the computer programs include a function for identifying a moving object, which cannot be captured by the image sensor, by utilizing the obtained sound signals.

2. The environment assessment system for correlating environmental data with traffic data of claim 1,
   wherein the environment sensor system includes a PM sensor for measuring the PM concentration of any one of PM 1.0, 2.5, 4.0, 10, or any combination thereof.

3. The environment assessment system for correlating environmental data with traffic data of claim 1,
   wherein the computer programs include a function for identifying the moving object by utilizing specific sound signals or specific frequency ranges which have been obtained by a pre-learning carried out before classifying the traffic data.

4. The environment assessment system for correlating environmental data with traffic data of claim 1,
   wherein the computer programs include a function for classifying the moving objects including the same body shape having different engine types.

5. The environment assessment system for correlating environmental data with traffic data of claim 1,
   wherein a unique sensor identification (SID) is assigned to the sensor system.

6. The environment assessment system for correlating environmental data with traffic data of claim 1,
   the server has a function for obtaining a correlation coefficient between the traffic data and environmental data.

7. The environment assessment system for correlating environmental data with traffic data of claim 6,
   wherein the traffic data and the environmental data have different timestamps by referring to a travel time of air including the environmental data from the moving object emitted the environmental data to a point where the traffic count system is installed.

8. The environment assessment system for correlating environmental data with traffic data of claim 1,
   wherein the computer programs include a function for giving the same identification code onto two moving objects when two traffic/environmental systems identify that the moving objects passing by two observation points where the traffic/environment system is installed are the same.

9. The environment assessment system for correlating environmental data with traffic data of claim 8,
   wherein the same identification code is kept in the server in a certain limited time.

10. The environment assessment system for correlating environmental data with traffic data of claim 9,
   wherein the certain limited time is determined based on a moving time of the moving objects between two points where the traffic/environment system is installed.

* * * * *